(12) United States Patent
Sawano et al.

(10) Patent No.: US 6,285,381 B1
(45) Date of Patent: Sep. 4, 2001

(54) DEVICE FOR CAPTURING VIDEO IMAGE DATA AND COMBINING WITH ORIGINAL IMAGE DATA

(75) Inventors: Takao Sawano; Hirofumi Matsuoka; Takashi Endo, all of Kyoto (JP)

(73) Assignee: Nintendo Co. Ltd., Kyoto (JP)

( * ) Notice: Subject to any disclaimer, the term of this patent is extended or adjusted under 35 U.S.C. 154(b) by 0 days.

(21) Appl. No.: 09/190,601

(22) Filed: Nov. 12, 1998

(30) Foreign Application Priority Data

Nov. 20, 1997 (JP) .................................................... 9-337655

(51) Int. Cl.[7] ................................ G06F 3/00; G06T 3/00
(52) U.S. Cl. ...................... 345/726; 345/634; 345/582; 345/716; 345/764
(58) Field of Search .................................... 345/327, 339, 345/433–435, 423, 425–426; 348/576, 584, 586, 589; 358/906, 909.1

(56) References Cited

U.S. PATENT DOCUMENTS

| | | | |
|---|---|---|---|
| 4,104,625 | 8/1978 | Bristow et al. | 353/30 |
| 4,359,223 | 11/1982 | Baer et al. | 463/2 |
| 4,467,349 | 8/1984 | Maloomian | 348/77 |
| 4,521,014 | 6/1985 | Sitrick | 463/31 |
| 4,539,585 | 9/1985 | Spackova et al. | 382/100 |
| 4,566,263 | 1/1986 | Miyazaki et al. | 57/276 |
| 4,591,897 | 5/1986 | Edelson | 348/589 |
| 4,710,873 | 12/1987 | Breslow et al. | 463/31 |
| 4,731,743 | 3/1988 | Blancato | 345/435 |
| 4,823,285 | 4/1989 | Blancato | 345/435 |
| 5,111,409 | 5/1992 | Gasper et al. | 345/302 |
| 5,185,665 | 2/1993 | Okura et al. | 348/584 |
| 5,191,645 | 3/1993 | Carlucci et al. | 345/328 |
| 5,237,648 | 8/1993 | Mills et al. | 345/433 |
| 5,369,736 | * 11/1994 | Kato et al. | 345/425 |
| 5,430,496 | 7/1995 | Silverbrook | 348/589 |
| 5,459,819 | 10/1995 | Watkins et al. | 358/1.18 |
| 5,533,181 | 7/1996 | Bergsneider | 345/473 |
| 5,553,864 | 9/1996 | Sitrick | 463/31 |
| 5,595,389 | 1/1997 | Parulski et al. | 463/31 |
| 5,601,487 | 2/1997 | Oshima et al. | 463/4 |
| 5,680,533 | 10/1997 | Yamato et al. | 345/473 |
| 5,796,429 | 8/1998 | Suzuki et al. | 348/239 |
| 5,830,065 | 11/1998 | Sitrick | 463/31 |
| 5,880,740 | * 3/1999 | Halliday et al. | 345/435 |
| 6,026,215 | * 2/2000 | Fantone et al. | 345/435 X |
| 6,064,393 | * 5/2000 | Lengyel et al. | 345/426 X |

FOREIGN PATENT DOCUMENTS

| | | | |
|---|---|---|---|
| 2130842 | 6/1984 | (GB) | H04N/9/50 |
| 2323738 | 9/1998 | (GB) | H04N/5/265 |

OTHER PUBLICATIONS

Game Boy ® Camera Instruction Booklet.

* cited by examiner

*Primary Examiner*—Raymond J. Bayerl
*Assistant Examiner*—X. L. Bautista
(74) *Attorney, Agent, or Firm*—Nixon & Vanderhye

(57) ABSTRACT

A frame of still picture data is captured at an instant specified by a user from video signals supplied from a given video source, such as a television receiver, a video camera, etc., and the image data is displayed. When the user specifies an area of image to be cut out from the displayed still picture, the image data in the specified area is cut out and recorded as a cutout image. Each cutout image recorded is displayed in the form of an icon. When any of the icons is selected by the user, the corresponding cutout image data is read and pasted in a part to be changed in the original image data. Thus an image can be easily created by user's choice.

7 Claims, 14 Drawing Sheets

F I G. 8
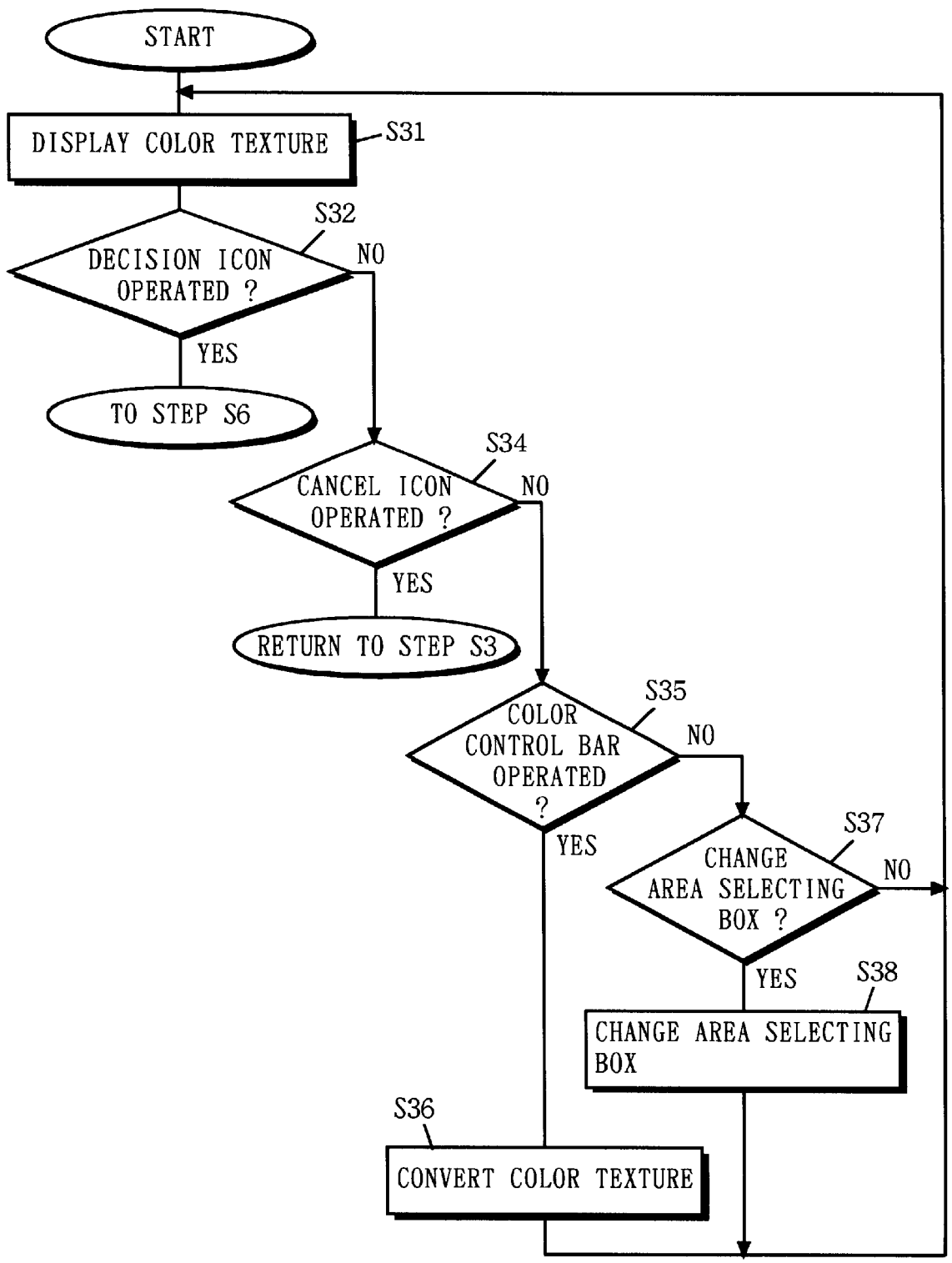

A/LEFT -CAPTURE IMAGE
B/RIGHT-RETURN

DEVICE FOR CAPTURING VIDEO IMAGE DATA AND COMBINING WITH ORIGINAL IMAGE DATA

BACKGROUND OF THE INVENTION

Field of the Invention

The present invention relates to image display devices such as home videogame systems, and more particularly to an image display device which captures image data supplied from a video source, such as a television receiver, a video camera, etc., and combines the captured image data with predetermined image data to create and display a combined image. The invention also relates to such a system which processes an image obtained by the capture process before applying the processed image to the predetermined image.

DESCRIPTION OF THE BACKGROUND ART

Conventional image processing software for personal computers allows a user to cut out a partial image from a still picture and superpose it onto another still picture to create a desired image. Such conventional image processing software, however, generally requires the user to perform complicated operations to accomplish this result. For example, it was generally necessary in one such prior arrangement for a user skilled in operating personal computers to perform a sequence of complex image creating process steps by, for example, specifying each action corresponding to the processing procedure through operating system functions. In such conventional image processing techniques, for example, a user might be required to perform the operations of:

reading two still pictures and storing the information into a given storage location on hard disk;

specifying a cutout area on one of the still pictures;

temporarily saving the cutout image data in a memory;

specifying a display area on the other still picture for superposing the cutout image data;

writing the cutout image data into the storage region corresponding to that display area;

discarding the unwanted image after cut out; and displaying the superposed image.

It was generally difficult for users untrained in operating personal computers to create desired images using such steps. Further, even for an operator skilled in operating personal computers, the operation was generally so complicated that creating desired composite images took a long time. Accordingly, it was generally quite difficult for children to create such computer graphic images in the course of playing a game, for example. Moreover, generally only a limited number of images could be combined at a time, and displaying the combined image as a moving or animated picture was difficult.

SUMMARY OF THE INVENTION

The present invention solves this problem by providing an image creating arrangement capable of creating a desired composite image by very easy and simple operations.

The present invention also provides an image creating device capable of displaying a created image and animating it according to a predetermined operating program.

One aspect of the present invention is directed to an image creating arrangement for capturing image data supplied from a video source and combining the captured image data with predetermined image data to create a desired image, and displaying the desired image on a display device. The desired image can be animated in response to user input controls and/or program instructions. An example image creating device implementation comprises:

an operation input arrangement used to allow a user to input instructions for image creation;

an initial image data store temporarily storing initial image data;

a captured image store temporarily storing captured image data;

a cut out image store temporarily storing image data cut out from the captured image data;

a display image store storing image data for the desired image to be displayed;

a program store storing a program for image creation; and a processor performing an image creation operation on the basis of the stored program;

wherein the stored program includes, a first write program instruction sequence responsive to operation of the operation input arrangement, for capturing the image data supplied from a video source and writing the image data into the captured image store as captured image data, a first read/display program instruction sequence for reading the stored captured image data and displaying the captured image on a display device, a cutout program instruction sequence for, when the operation input arrangement is operated to specify an image area to be cut out from the captured image displayed on the display device, temporarily storing the image data corresponding to the specified area into the cutout image store as cutout image data, a second read/display program instruction sequence for reading the cutout image data stored in the cutout image store and displaying the cutout image data as an icon or other small image in part of screen of the display device, a second write program instruction sequence for reading the initial image data stored in the initial image data store and writing the initial image data into the display image store, a third write program instruction sequence for, when the operation input arrangement is operated to select the displayed cutout image (e.g., in order to combine and display the cutout image in an image display position corresponding to a part of the displayed initial image), writing the corresponding cutout image data stored in the cut out image store into a corresponding region of the display image store, and a third read/display program instruction sequence for reading the combined image data stored in the display image store in which the cutout image data is written and displaying the combined image data on the display device.

The preferred implementation of the invention provides many advantages. For example, it is not necessary to newly create an initial image, since an initial image for use as a base for image creation can be prepared in advance. The process of pasting a cutout image into a specified position can be accomplished by the easy operation of specifying the position on the displayed original image. Moreover, as it is possible to capture the image while viewing the displayed object produced from video signal supplied from a video source, an image can be captured not only from a still picture but also from a moving picture. Further, an image in a desired area can be cut out by an easy operation of specifying the cutout area on the captured image. Moreover, an image to be pasted can be easily selected since cutout images can be recorded as icons. In this way, a desired image can be created from previously prepared initial original image(s) by very easy operations, so that even users unskilled in operating personal computers and children can easily create images.

According to a further aspect of the invention, an image creating device may provide a program store further containing a correcting program for applying correction and/or editing processing to the initial image data in a peripheral part in the cutout area specified by the operation input portion before the cutout image data is written into the second cutout image store. Thus, when an image in a desired area is cut out from the captured image, its peripheral part can be corrected. Accordingly, the original image and the cutout image can be combined without causing unnatural image certificates or other impressions at the boundary between them.

According to a further aspect provided by the invention, an image creating device cutout program instruction sequence cuts out the image data in a rectangular area specified by the operation input arrangement, and the correcting program corrects the cutout image data in the specified rectangular area by shading off a peripheral part around a shape defined by excluding the four corners of the specified rectangular area.

According to a still further aspect, the program store further contains a motion giving (e.g., animation) program for applying motion to individual parts of the initial image. When reading the combined image data stored in the display image store (e.g., on the basis of the third read/display program instruction sequence), the processor processes the combined image data on the basis of the motion program to change position and motion of the individual parts of the combined image. It is thus possible to animate the image created by combining the captured image with the original image according to a predetermined operating program, which enables more enjoyable image creation.

According to a further aspect, the cutout program temporarily stores the cutout image data corresponding to the specified area into the cutout image store each time the operation input portion is operated to specify an area of image to be cut out. The second read/display program instruction sequence reads the plurality of cutout images stored in the cutout image store and separately displays the plurality of cutout image data parts of the screen of the display device. As stated above, according to this aspect, a plurality of cutout images stored in the second temporarily storing portion are read and displayed in the display device. This allows the user to see already recorded cutout images all together to easily select a cutout image to be pasted on the original image.

According to a further aspect, the initial image store stores the initial image data in the form of 3D polygon data composed of a group of a plurality of polygons to display an image of a moving object as the initial image. The program store further contains a motion applying program instruction sequence for applying motion to individual parts of the object.

The second write program instruction sequence may create display image data on the basis of the plurality of polygon data stored in the original image data storing portion, and may write the display image data into the display image store. The third write program instruction sequence writes the cutout image data stored in the cutout image store into a storage region in the display image store corresponding to a polygon position of the part to be changed which was specified by operation of the operation input arrangement. The processor reads the combined image data stored in the display image store to display an image obtained by combining the image based on the polygon data with the cutout image in the display device, and writes image data changed so that the individual parts based on the polygon data can be moved at a predetermined cycle or rate on the basis of the motion applying program into the third temporary store.

As stated above, according to this aspect, a three-dimensional image can be created quite easily. Further, the created image can be displayed as an animated image moving according to a predetermined operating program.

According to a further aspect, the program store further contains a display control program instruction sequence for controlling display of the moving object. The display control program includes a program for displaying a background image for the moving object, and a program responsive to operation of the operation input arrangement, for applying changes different from original motion to the motion of the moving object. A background image can be automatically created when creating three-dimensional images.

BRIEF DESCRIPTION OF THE DRAWINGS

These and other objects, features, aspects and advantages of the present invention will become more apparent from the following detailed description of the present invention when taken in conjunction with the accompanying drawings.

FIG. 8 is a subroutine flowchart showing an example cutout area selecting process;

DETAILED DESCRIPTION OF THE PREFERRED EXAMPLE EMBODIMENTS

Figure 1:
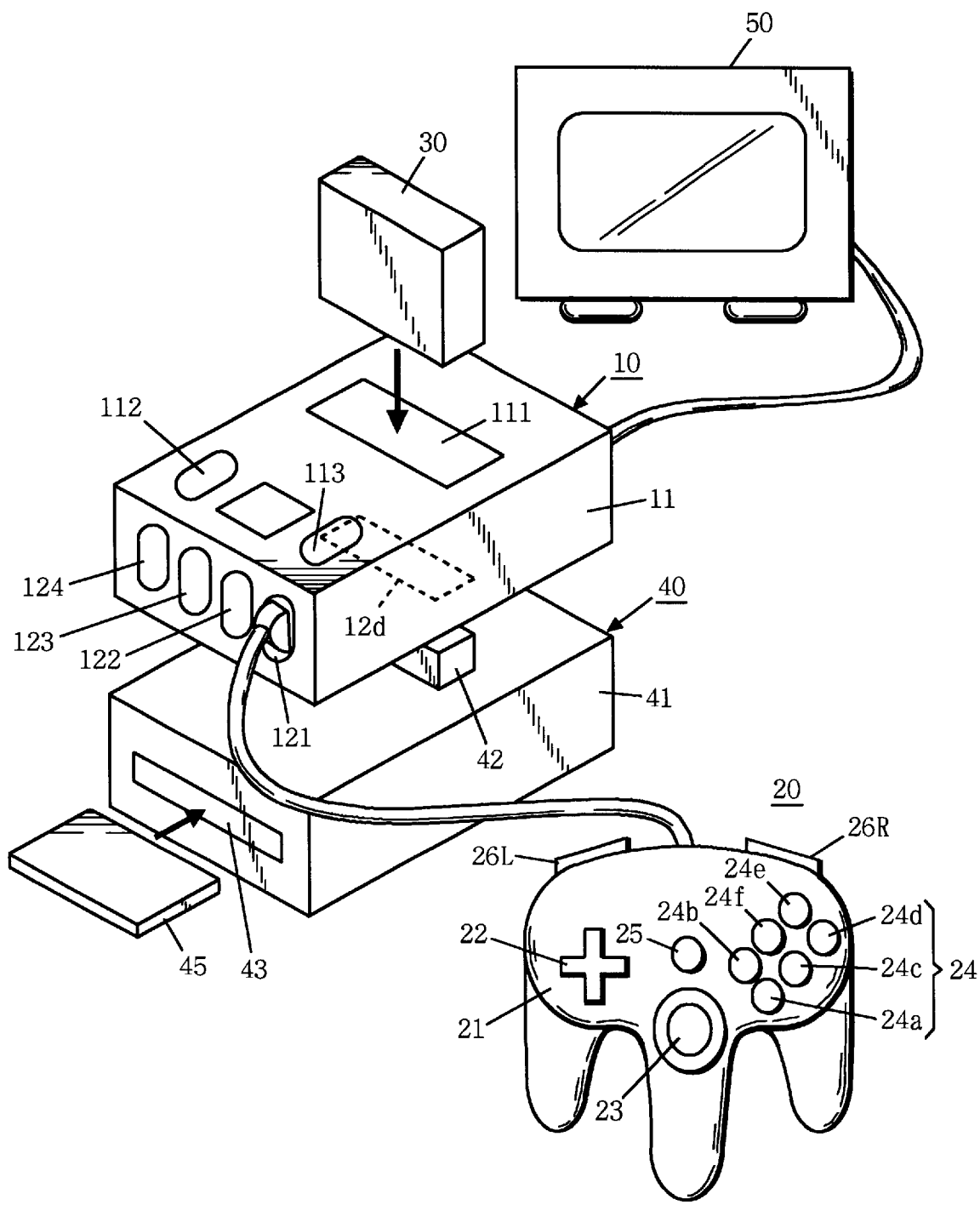
FIG. 1 is a perspective view showing an example external appearance of an example image display (e.g., video game) system according to an embodiment of the present invention.

FIG. 1 is a perspective view showing the external appearance of an example image creating (display) system 5 according to an embodiment of the present invention. In this example, system 5 comprises a home video game machine system. In FIG. 1, the image creating system 5 of this embodiment captures video signals supplied from a given video source (a television receiver, a video camera, a video cassette recorder, etc.) and processes data by using the image based on the captured video signals to create an image suited to user's preference.

In this example, system 20 includes a main unit of the video game system (hereinafter referred to as a game machine) 10. Formed on the top surface of the housing 11 of the game machine 10 are an insertion slot 111 for inserting a cartridge 30, and a power switch 112 and a reset switch 113 on the side. The cartridge insertion slot 111 has a cartridge connector 12c (see FIG. 2) provided on its inner side. Provided on the front panel of the game machine 10 are controller connectors 121, 122, 123 and 124 for connection with hand-controllers 20. An extension connector 12d for connection with a disk drive device 40 is provided on the bottom of the game machine 10.

The controller 20 has a housing 21 with a plurality of (three in the drawing) handles. Provided on the top of the controller housing 21 are:

- a direction specifying switch 22 for specifying direction of movements of characters or objects operated by a player,
- an analog stick (also called a 3D stick or a joy stick) 23 for analogously specifying the moving direction, and
- a group of operating switches 24 including a reset/start button 25.

The group of operating switches 24 includes switches 24a to 24f, which are used to specify actions of the player characters or player objects in a game mode, and to select various kinds of commands in an image creating input mode. Side switches 26L and 26R for requesting other actions are provided on the upper side of the housing 21.

Provided on the top of the housing 41 of the disk drive 40 is a connector 42 to be connected to the extension connector 12d. A disk insertion slot 43 is formed on the front side of the housing 41. Inserted into the disk insertion slot 43 is a writable/readable disk-like recording (or storing) medium (hereinafter referred to as a disk) 45, such as a magnetic disk, magneto-optic disk, etc.

A display device 50 like a household television receiver is connected to the game machine 10.

Game System Example Block Diagram

Figure 2:
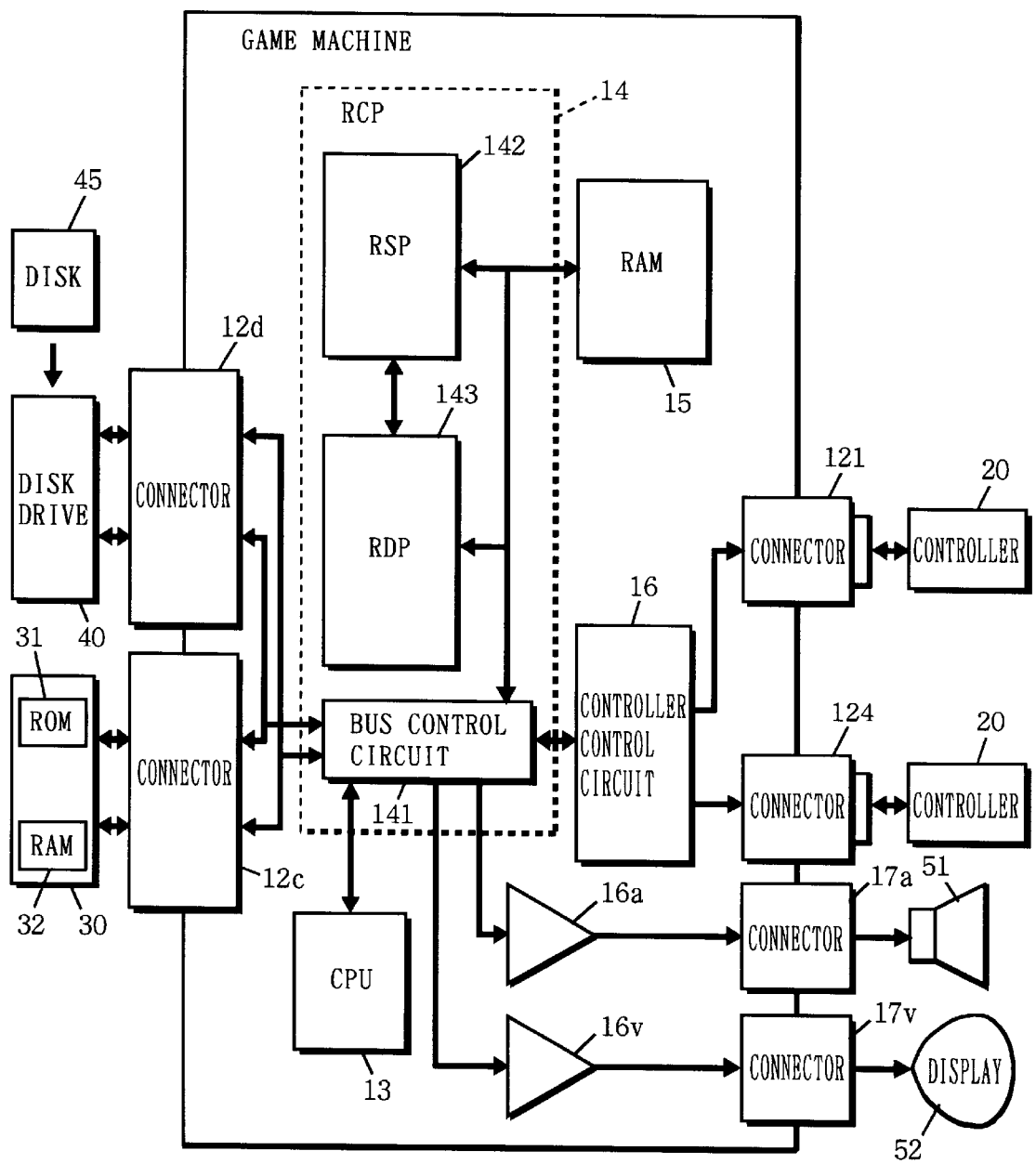
FIG. 2 is a block diagram showing an example electrical block diagram of the video game system shown in FIG. 1.

FIG. 2 is a block diagram showing the electric 11 configuration of the video game machine system 10 shown in FIG. 1. In FIG. 2, the game machine 10 (which may be, for example, a Nintendo 64 video game system manufactured by Nintendo since 1996) includes an information processing unit (hereinafter referred to as a CPU) 13. The CPU 13 performs processing for image creation or game play on the basis of program instructions stored in the memory cartridge 30 or the disk-like storage medium 45. A bus control circuit 141 included in a coprocessor (hereinafter referred to as an RCP) 14 is connected to the CPU 13. The RCP 14 includes a first image processing unit (a reality signal processor, hereinafter referred to as RSP) 142 and a second image processing unit (reality display processor, hereinafter referred to as RDP) 143. The RSP 142 is a processor for executing signal processing such as polygon coordinate transformation, light source processing, etc. The RDP 143 is a processor for converting polygon data into image data that can be displayed and stored in a data format within frame memory included in the RAM 15. The RSP 142, RDP 143, and RAM 15 are connected to the CPU 13 through the bus control circuit 141. The RAM 15 will be described later in greater detail referring to FIG. 4.

Also connected to the bus control circuit 141 are connectors 12c, 12d, and a controller control circuit 16. The memory cartridge (hereinafter referred to as a cartridge) 30 is detachably connected to the connector 12c. Connected to the connector 12d is the disk drive 40. The connectors 121, 122, 123 and 124 are connected to the controller control circuit 16. These connectors 121 to 124 are connected to controllers 20 of the respective users (or players). Further, an audio signal generating circuit 16a and a video signal generating circuit 16v are connected to the bus control circuit 141. The audio signal generating circuit 16a is connected to a speaker 51 in the display device 50 through an output connector 17a. The video signal generating circuit 16v is connected to a CRT display 52 in the display device 50 through an output connector 17v.

Example Memory Maps

Figure 3:
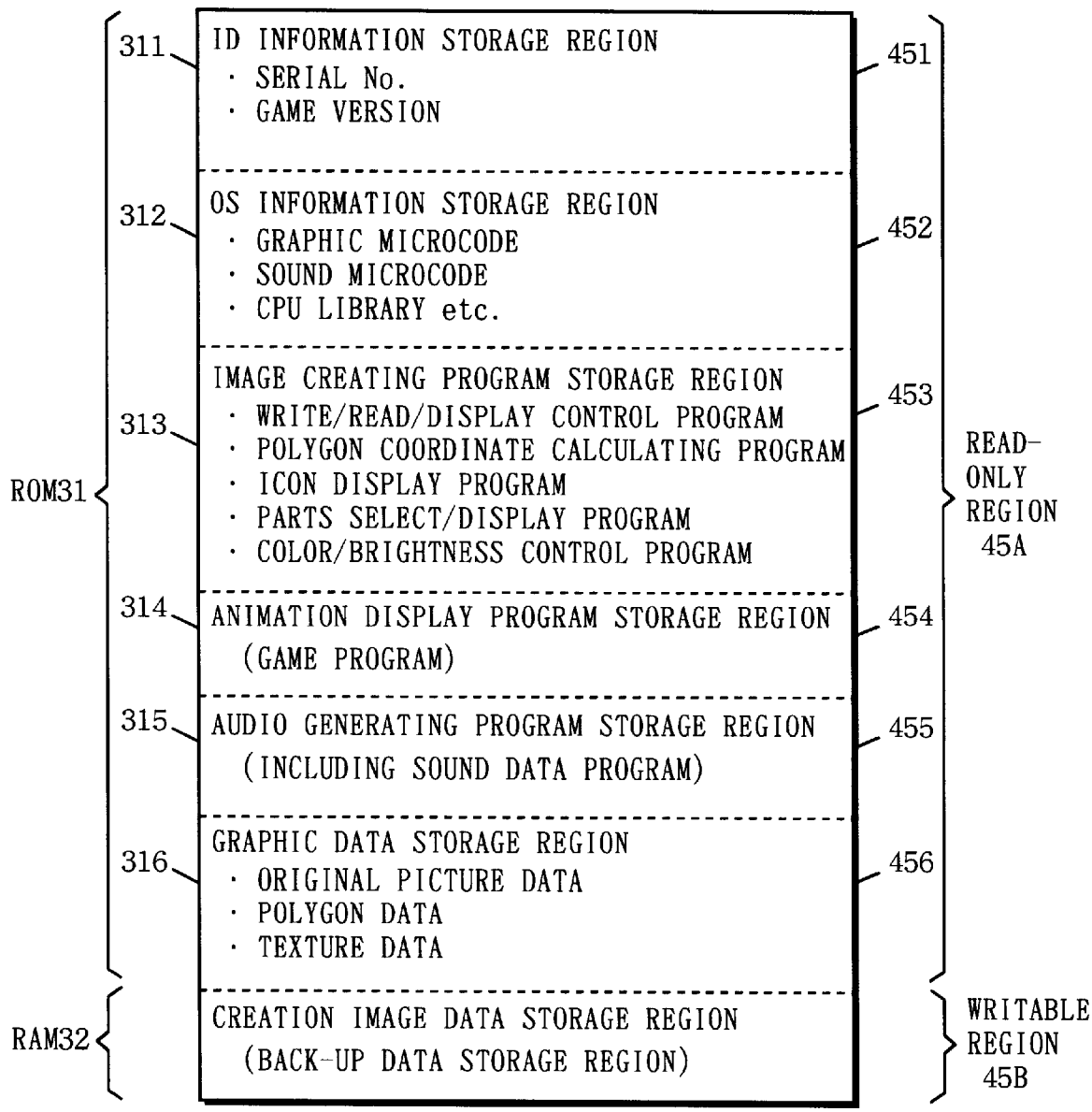
FIG. 3 is a diagram showing an example memory map of a cartridge 30 and/or a disk 45 of an example of an external storage medium.

FIG. 3 shows a storage region (memory) map of the cartridge 30 and/or disk 45 as an example of an external storage medium. When the cartridge 30 is used as the external storage medium, it includes a non-volatile memory (hereinafter referred to as ROM) 31 for fixedly storing program data and a writable/readable memory (hereinafter referred to as RAM) 32. The ROM 31 includes

- an identification (ID) information storage region 311,
- an OS information storage region 312,
- an image creating program storage region 313,
- an animation display program (game program) storage region 314,
- an audio generating program, including sound data program storage region 315, and
- a graphic data storage region 316.

Stored in the ID information storage region 311 in the ROM 31 are the serial No. of the external storage medium, game version data, etc.

Stored in the OS (operating system) storage region 312 are information such as graphic microcode, sound microcode, CPU library, etc.

Stored in the image creating program storage region 313 are programs for realizing the operation shown in the flowcharts in FIG. 5 to FIG. 10 described later, such as:

- write/read/display control program instructions,
- polygon coordinate calculating program instructions,
- icon display program instructions,
- parts select/display program instructions, color/brightness control program instructions, etc.

Stored in the animation storage region 314 are programs for giving predetermined action (or motion) by using a user-created image i.e., game program).

Stored in the audio program storage region 315 are audio for BGM, sound effects in game, etc.

Stored in the graphic data storage region 316 are original or original image) data, polygon data, texture data, etc.

The RAM 32 is used to store image data for creation from video signal by the user, or game backup data.

When the disk 45 is used as the external storage medium, the storage region is divided into a read-only region 45A and a writable region 45B. The read-only region 45A corresponds to the ROM 31 in the cartridge 30, which is used to store the ID information storage region 451, OS information storage region 452, image creating program storage region 453, animation display program storage region 454, audio generating program storage region 455, and graphic data storage region 456. The writable region 45B corresponds to the RAM 32, which is used to store creation image data storage region.

Whether to use the cartridge 30 or the disk 45 as the external storage medium depends on the required storage capacity (especially the capacity required in the writable region). This choice can be freely selected by the software developer.

Figure 4:
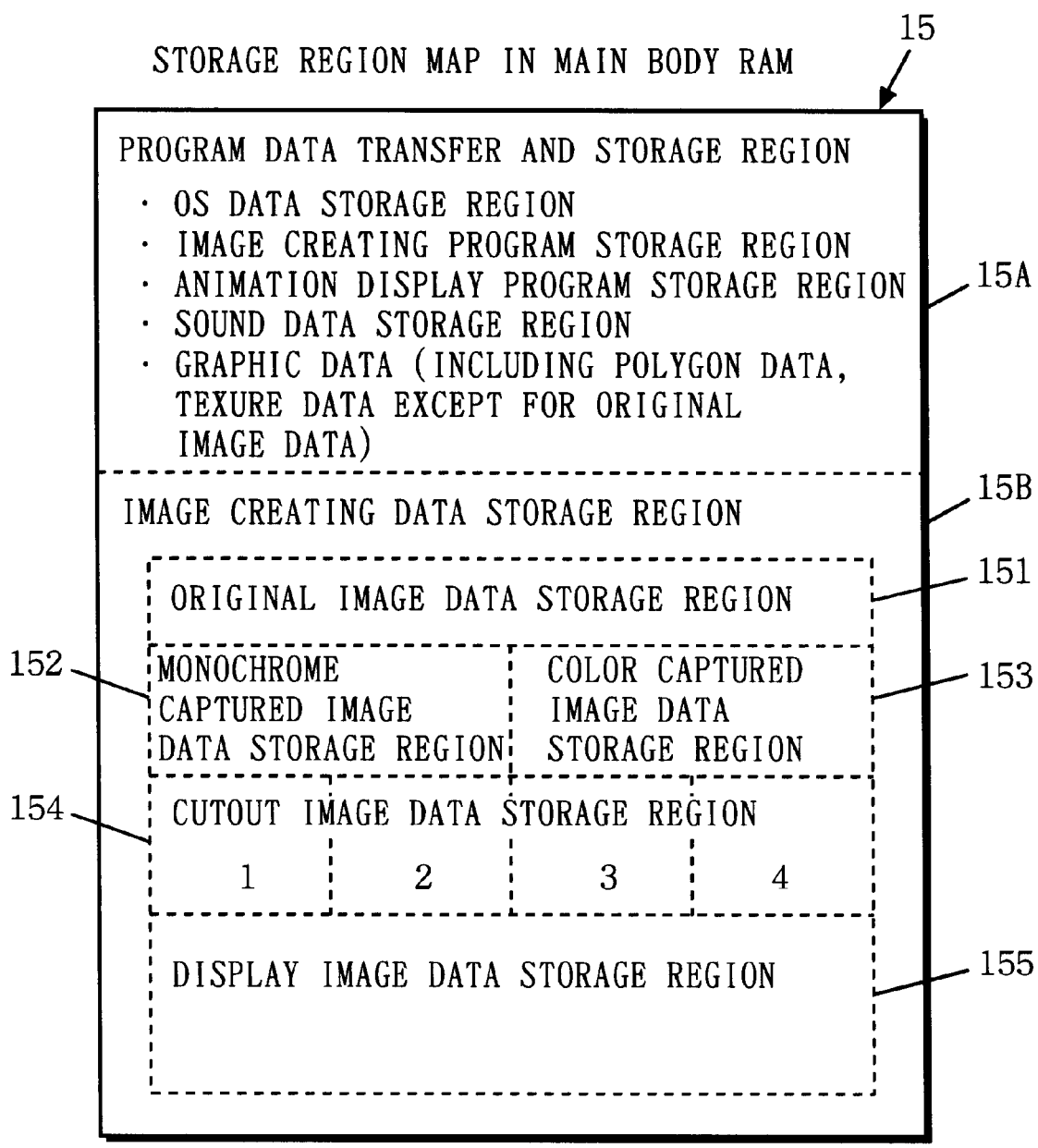
FIG. 4 is a diagram showing an example memory map of a RAM 15 provided in the game system 10.

FIG. 4 is an example storage region memory map of the RAM 15 provide in the game machine 10. In FIG. 4, the RAM 15 provides a program data transfer and storage region 15A and an image creating data storage region 15B. In one example, part of the program data stored in the ROM 31 or the read-only region 45A in the disk 45 shown in FIG. 3 are transferred and stored in the program data transfer and storage region 15A. The image creating data storage region 15B is used to temporarily store image data being processed in respective process steps for creating a desired image by using a captured image.

For example, the image creating data storage region 15B includes:

an original or initial image data storage region 151,
a monochrome captured image data storage region 152,
a color captured image data storage region 153,
a cutout image data storage region 154, and
a display image data storage region 155.

The original image data storage region 151 is used to store original image data (e.g., an initial picture) for image creation by the user. In one example, such original image data comprises data representing a plurality of polygons defining images for display, e.g., an image of the character shown in the frame in FIG. 11 (described later), and texture (pattern tiles) data to be pasted on to certain parts of such an image formed with a plurality of polygons, such as hands, legs, body, face, etc.

The monochrome captured image data storage region 152 is used to temporarily store video luminance data that may vary frame by frame (i.e., moving pictures) when a video signal is supplied.

The color captured image data storage region 153 is used to temporarily store color image data of an image to be captured from the video (e.g., moving pictures) displayed in monochrome.

The cutout image data storage region 154 is used to temporarily store images to be cut out from the captured color image data as texture data. This cutout image data storage region 154 stores color data for a plurality of images (e.g., a face of a person) cut out from the image captured from the video signal, for example.

The display image data storage region 155 is a so-called frame memory. It defines a storage region corresponding to the number of dots on the display screen of the CRT display 52. It is used to temporarily store color data displayed on the screen.

Example Steps for Creating an Animation From Captured Images

Figure 5:
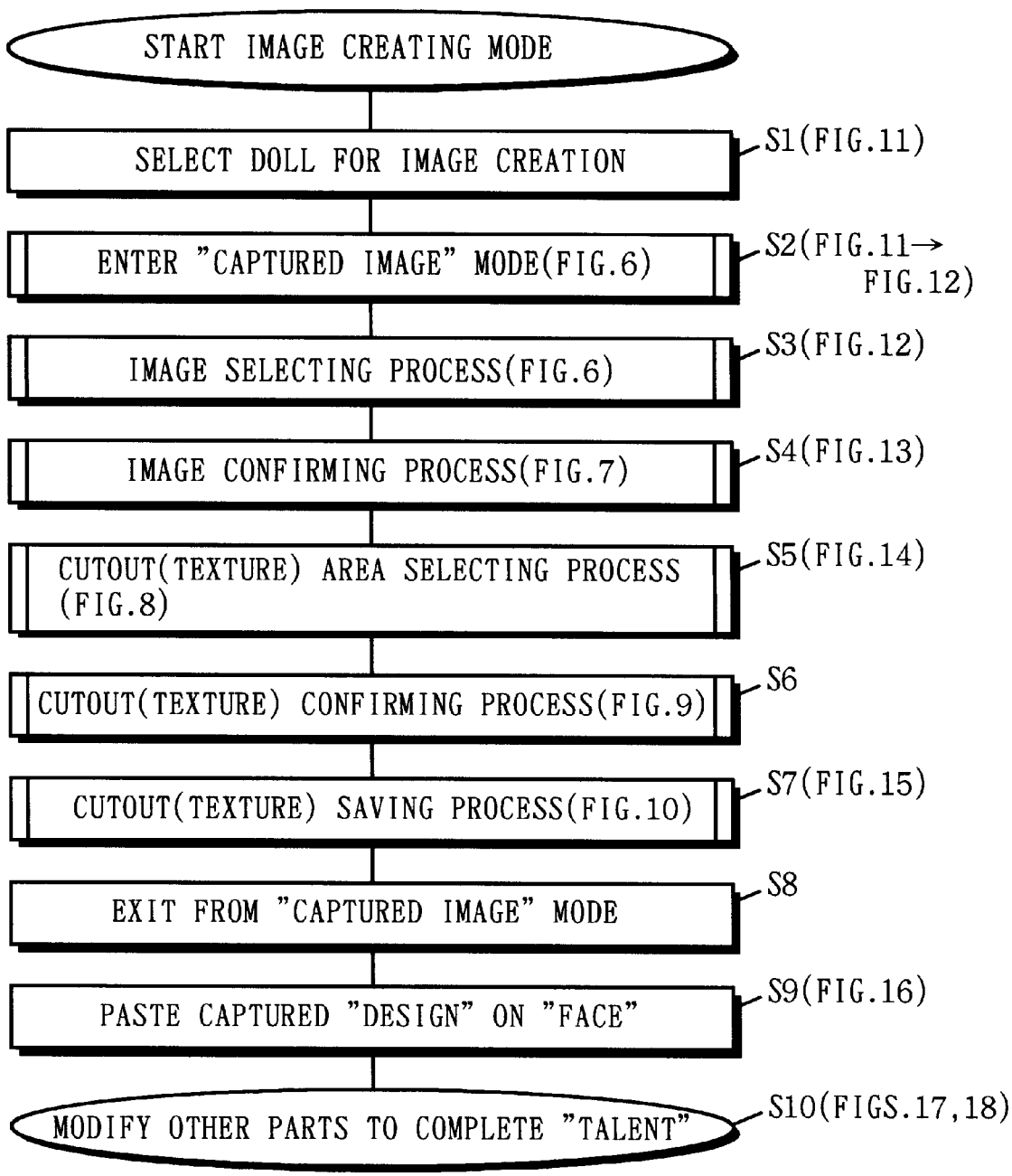
FIG. 5 is a flowchart showing an example main routine used to control operation of an image display device of an example embodiment of the present invention.

FIG. 5 is a flowchart showing an example main routine used to define the operations of the image creating/display device of an example embodiment of the present invention. FIGS. 6 to 10 are flowcharts of subroutines showing details of certain steps in the main routine. In FIG. 5, the numbers of diagrams enclosed in parentheses within the step boxes indicate those flowcharts of corresponding subroutines, and the Figure numbers on the right-hand side of the step numbers indicate corresponding drawings showing examples of images displayed in the respective steps.

Figure 11:
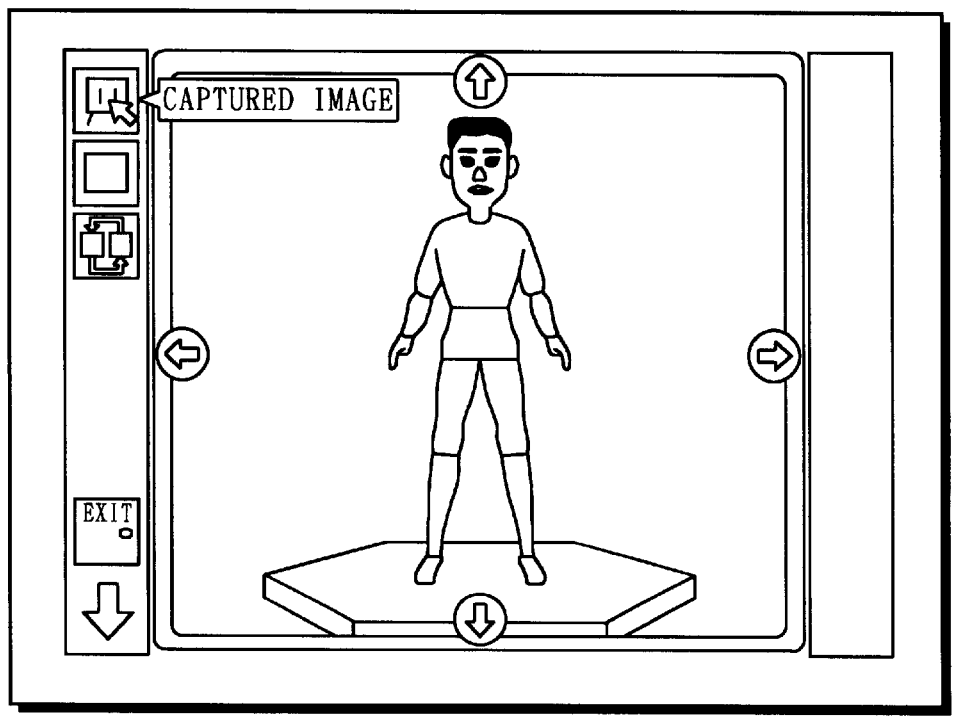
FIG. 11 is a diagram showing an example display provided when a character is selected.

The operation of the image creating device of this embodiment will be described referring to the main routine shown in FIG. 5 and the examples of screen displays corresponding to the individual steps. First, in step S1, a plurality of objects such as, for example, characters such as dolls, animals, and the like, are displayed in the CRT display 52 as starting or initial objects. Such initial objects are candidates the user may select for changing the face, clothes, etc. The user selects a desired character such as a doll or animal. FIG. 11 shows an example of an image displayed when a character is selected. At this time, icons showing functions selectable by the user are displayed around the display frame showing the original initial (unmodified) image of the selected character.

Figure 12:
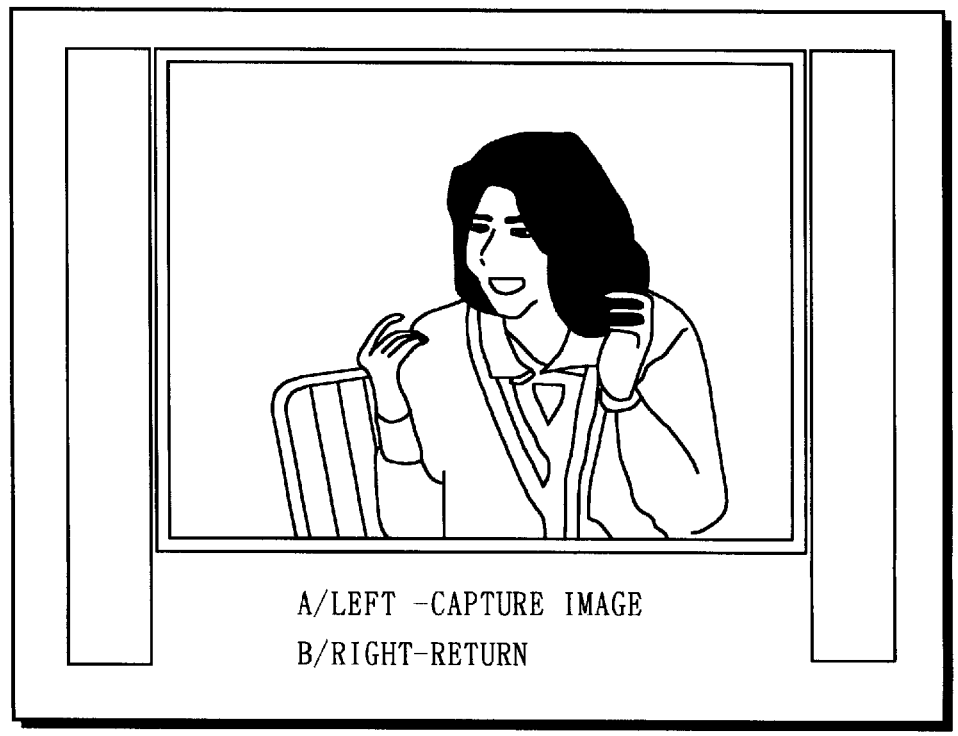
FIG. 12 is a diagram showing an example display used in the image selecting process.

Next, in step S2, when the user selects the "Capture Image" icon indicating capturing of image, the image creating device enters the capture image mode. In response, input video supplied from a predetermined video source (e.g., a television receiver, a video camera, a videocassette recorder, etc.) is displayed in an input video display frame on the CRT display 52. Further, commands indicating "Capture Image" and "Return" for returning to the display in FIG. 11 are displayed as the next selectable functions below the input video display frame (see FIG. 12). With these commands displayed, the display also indicates which of the operating switches 24a and 24b is to be used (A, B), and which of the four points (up, down, left, right) of the direction—specifying switch 22 is to be pressed (left, right) to select the commands. At this time, a live moving picture which varies frame by frame is displayed in monochrome in the input video display frame.

Figure 13:
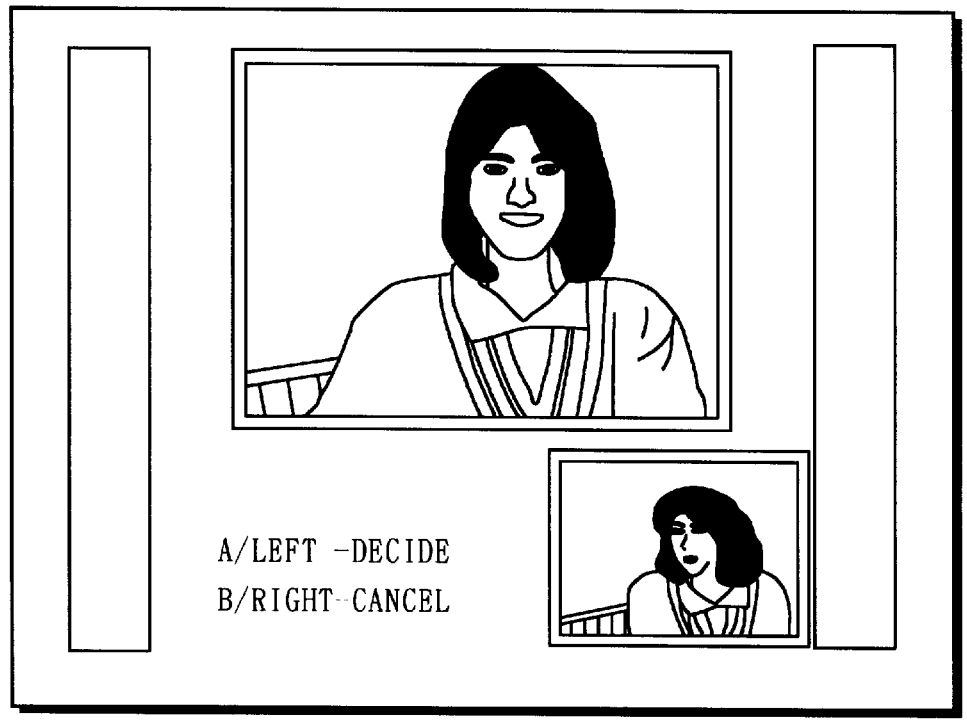
FIG. 13 is a diagram showing an example displayed used in the image confirming process.

When the user presses the operating switch 24a or the left side of the direction—specifying switch 22 to specify "Capture Image," the screen shows a display for a process of confirming the image (see FIG. 13) in the next step S4. In this image confirming process, the captured image is displayed in color in a large area in the center of the screen, and the live video being inputted is also displayed in monochrome in a small area in the lower right part of the screen. Also, commands are displayed asking the user whether to confirm selection of the capture the color image displayed in the upper center of the screen or whether to cancel it are displayed.

Figure 14:
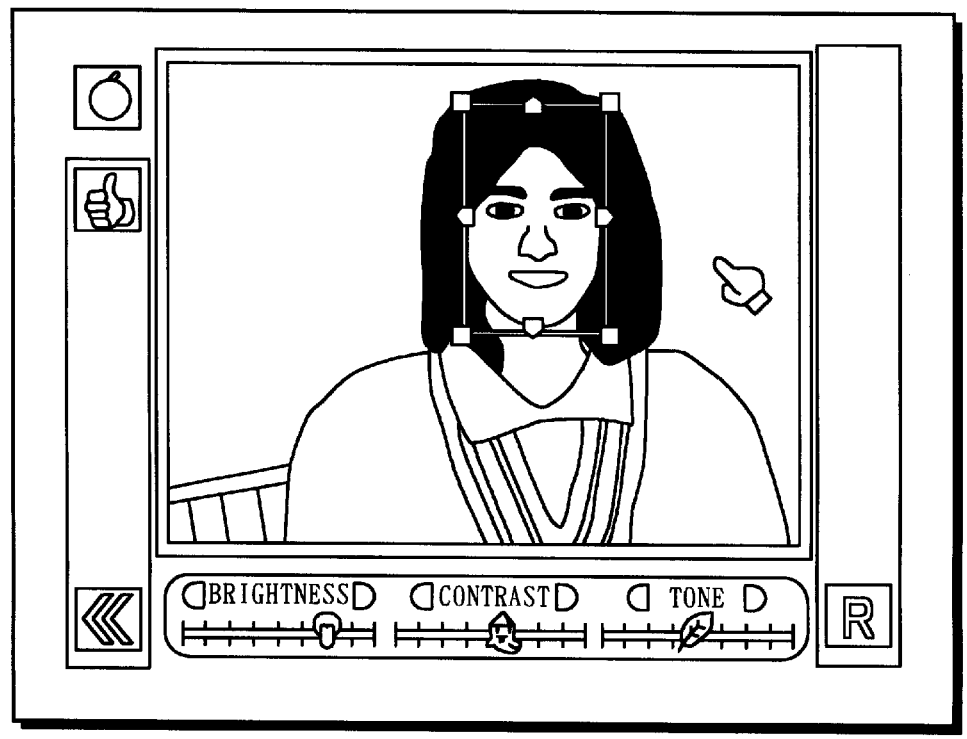
FIG. 14 is a diagram showing an example display used in the cutout image area selecting process.

When the user selects a decision command, a process of selecting a cutout area as texture is performed in step S5 (see FIG. 1a). For example, as shown in FIG. 14, the captured color image confirmed in step S4 is displayed in a large area, with a box (e.g., or a rectangular box) for specifying the area to be cut out from it. The user can change the size and dimensions of this displayed box in arbitrary ways by operating a cursor shaped like a hand. Controls for adjusting brightness, contrast, tone, etc. of the captured image data are displayed below the display frame showing the captured color image. The levels of brightness, contrast, and tone corresponding to the controls can be changed by operating the cursor. When the user has finished selecting a cutout area, an icon indicating the decision (e.g., "thumbs up") is selected.

Figure 15:
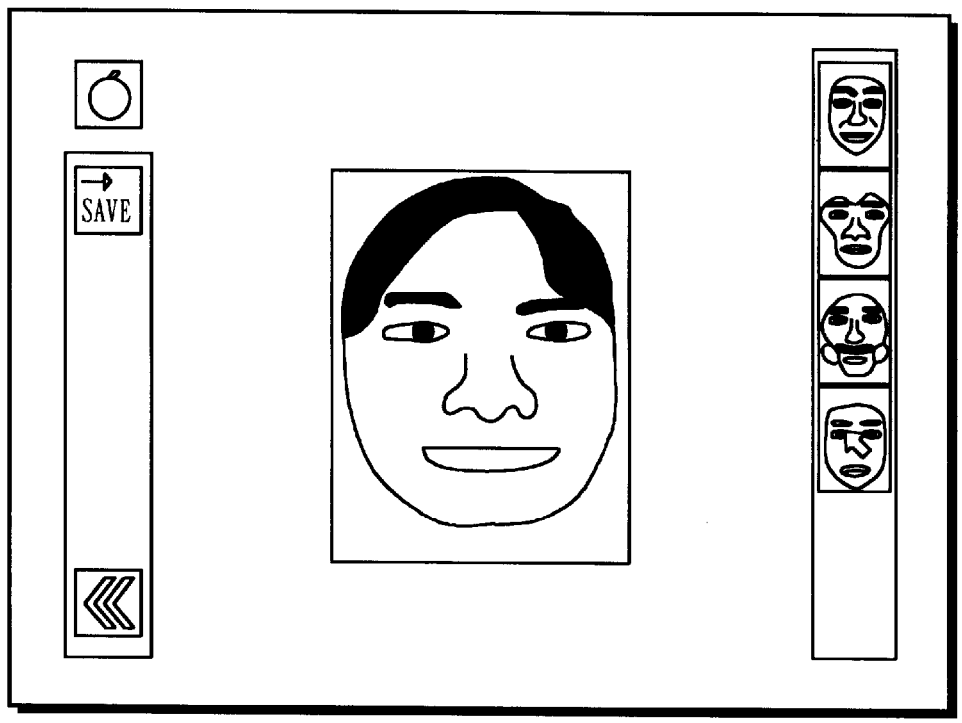
FIG. 15 is a diagram showing an example display used in the cutout image saving process.

Next, in step S6, a process for confirming the cutout image as texture is performed. Next, in step S7, the cutout image is saved as texture data in a free area in the cutout image data storage region 154. Then, as shown in FIG. 15, the selected cutout image texture data is displayed in the center of the screen. Previously selected cutout image texture data are also saved in some area in the image data storage region 154, and displayed as icons or thumbnails on the right side of the screen in a reduced size. At step S8, the image capturing processing is finished.

Figure 16:
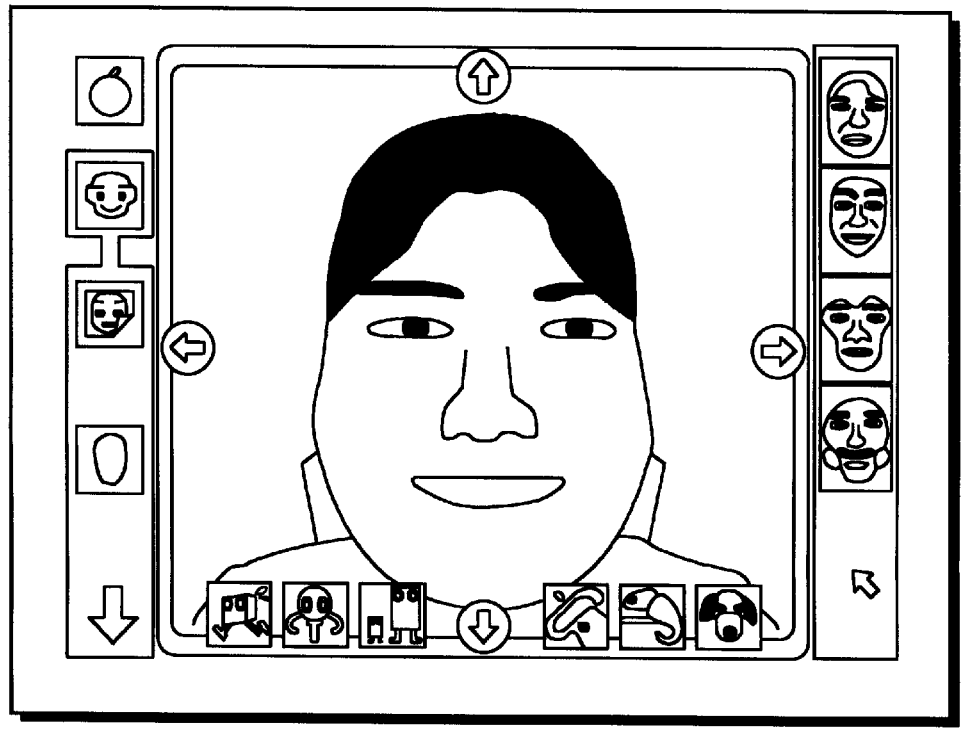
FIG. 16 is a diagram showing an example display used in a cutout image pasting process.
Figure 17:
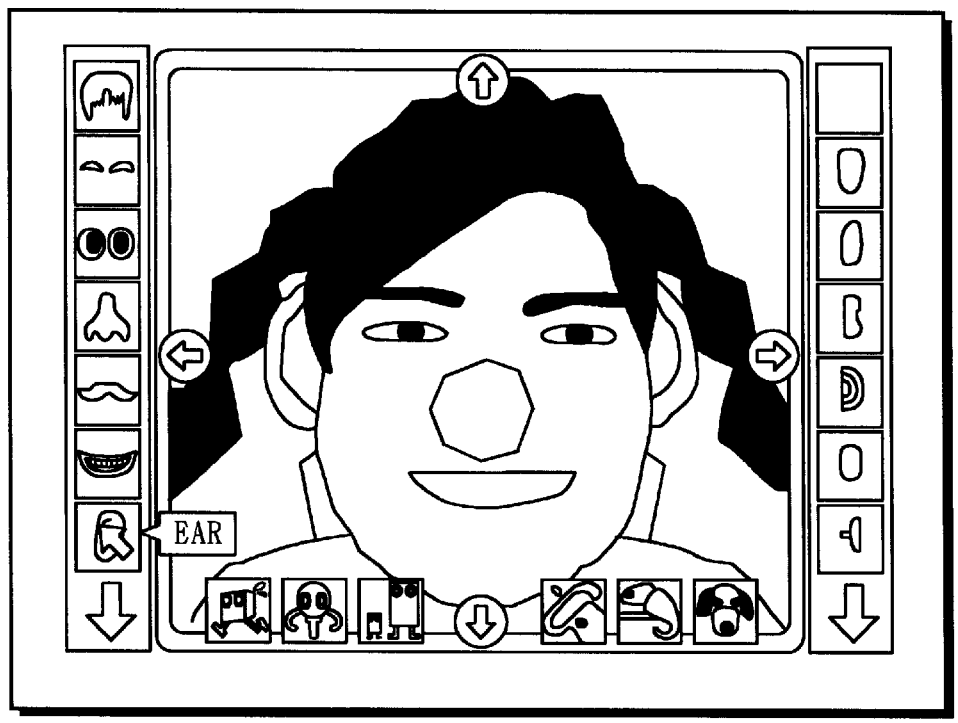
FIG. 17 is a diagram showing an example display shown while a desired image is being created (e.g., edited) by using cutout image.
Figure 18:
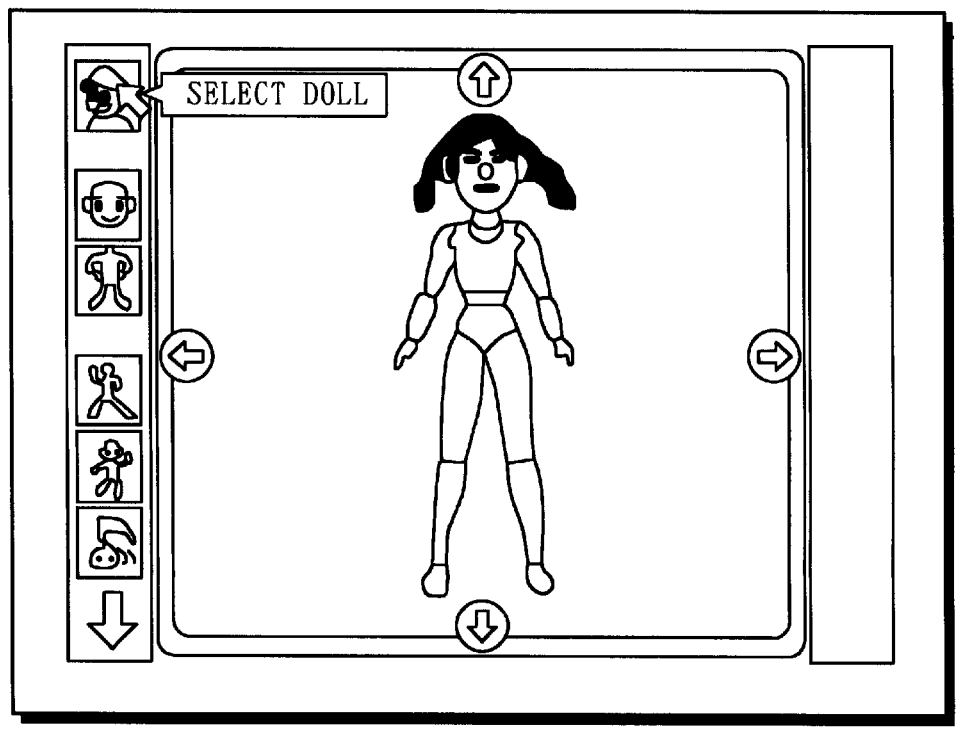
FIG. 18 is a diagram showing an example of a final combined created image providing a character that can be animated.

Next, in step S9, the saved selected cutout image texture data (e.g., of a face cut out from the captured image) is displayed in an enlarged manner as shown in FIG. 16. At this time, the user can edit the face of the cutout image as desired. For example, icons of a wig, nose, glasses, etc. can be selected, to cover the head with a chosen wig, change the shape of the nose, or to put glasses on the face. FIG. 17 shows an example image obtained by editing the face in the cutout image through user's choice of editing commands and operations. In the next step S10, an image creating process for editing other parts of the final image (e.g., editing based on choice, for changing the clothes, shapes of other parts, etc.) is performed, to complete the image of a character suited to the user's taste, as shown in FIG. 18.

Next, details (subroutines) of steps S2, S3, S4, S5, S6 and S7 in the main routine in FIG. 5 will be described.

Figure 6:
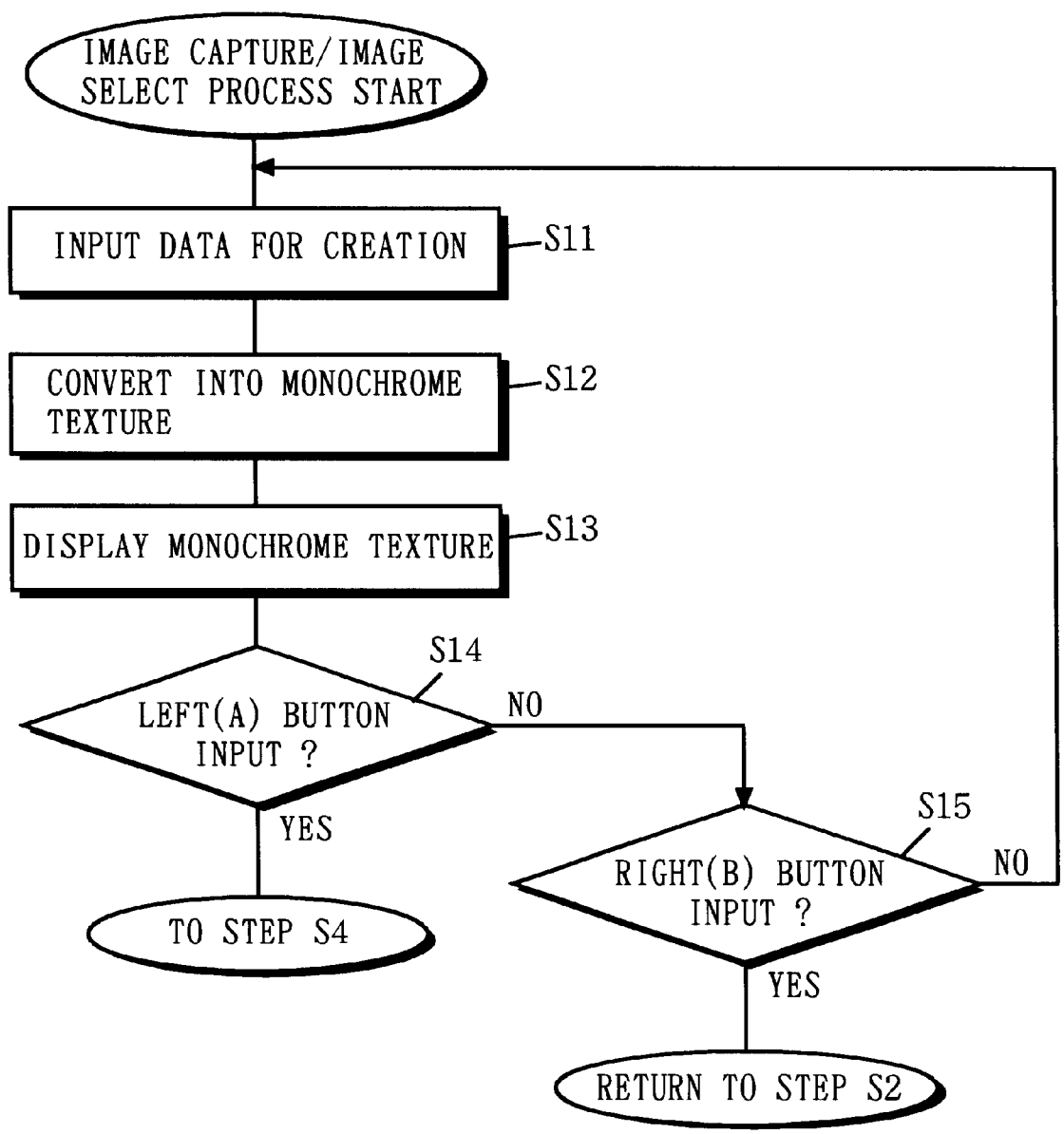
FIG. 6 is a subroutine flowchart showing an example image capturing/image selecting process.

The processing in steps S2 and S3 are accomplished by executing the image capturing/image selecting subroutine shown in FIG. 6. In step S11, with the image of the character as a base of the image creation displayed as shown for example in FIG. 11, the laser selects a command indicating image capturing, and then the routine moves to step S12. In step S12, in order to display a monochrome image based on the video signal, luminance data contained in the color video signal is extracted and converted into monochrome texture data, and the luminance data of monochrome captured image is written into the storage region 152. Next, in step S13, the monochrome captured image data stored in the storage region 152 is written into the storage area corresponding to the monochrome image display frame shown in FIG. 12 in the display image data storage region 155, and font data for displaying the command of "Capture Image" or "Return" are displayed below it on the screen. Subsequently, in step S14, it is determined whether the operating switch 24a is pressed (or the left side of the direction specifying switch 22 is pressed)—in other words, whether the "Decision" command is selected. When the decision command is not selected, it is determined in the next step S15 whether the operating switch 24b (or the right side of the direction specifying switch 22) for selecting the "Return" command is pressed. When the "Return" command is not selected, the routine returns to step S11 and the operations in steps S11 to S15 are repeated. The image creating device stays in a waiting state until some command is selected. If it is determined that the "Return" command is selected in this waiting state, the routine returns to the operation in step S2.

If it is determined in step S14 that the switch 24a (or the left side of the direction specifying switch 22) is pressed, or that the "Decision" command is selected, the routine moves to the next Step S4.

Figure 7:
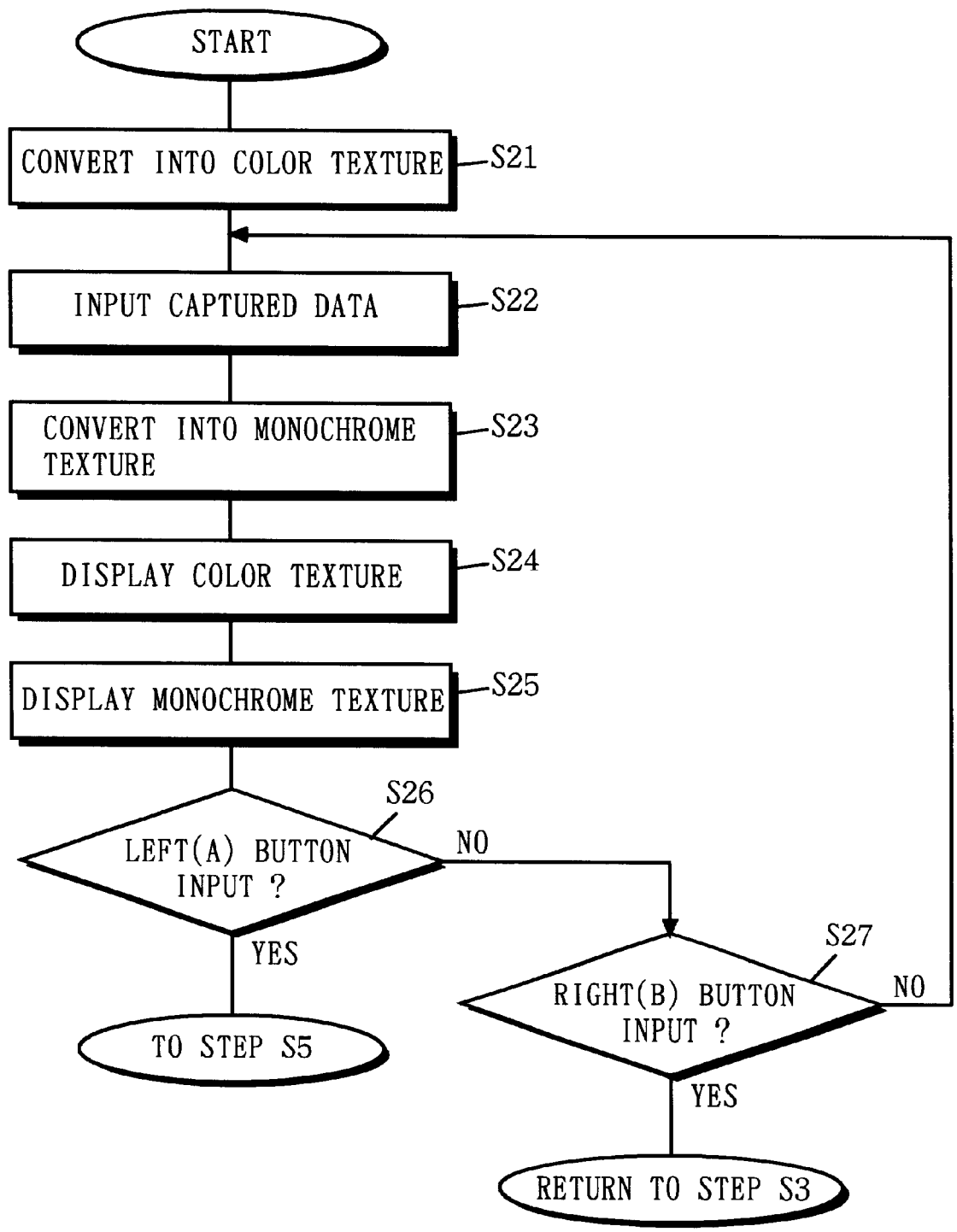
FIG. 7 is a subroutine flowchart showing an example image confirming process.

Next, referring to FIG. 7, the image confirming process (step S4) will be described in detail. First, at the instant of image capture determined in the above-described step S14, a process of converting from the video signal of the input video into color data is performed (step S21). Next, in Step S22, the color data of the capture color image is written into the storage region 153. Next, in step S23, the video signal is converted into monochrome image data (luminance signal) to be displayed as a live video moving picture, and written into the storage region 152. Next, in step S24, the color captured image data stored in the storage region 153 is displayed as a still picture color image as shown in the upper frame in FIG. 13. Next, in Step S25, the monochrome captured image stored in the storage region 152 is displayed in the area shown by the lower frame in FIG. 13 as a live video moving picture. At this time, the system also displays in the lower left part of the screen that a "Decision" or "Cancel" command should be selected, to prompt the user to select one of them. Then, in step S26, if it is determined that "Decision" has been selected, the routine moves to the next Step S5. When "Decision" is not selected and "Cancel" is not selected either, the operation moves back to step S22. When "Cancel" is selected, the routine returns to the image selecting process in step S3.

Next, referring to FIG. 8, the processing (step S5) for selecting the cutout area (in other words, the size of the required texture) will be described in detail. First, in step S31, the color captured image stored in the storage region 153 is displayed in a large area on the screen, and the box for the particular image to be cut out is selected by using the cursor (see the rectangular box around the face in FIG. 14). Next, in step S32, it is determined whether the icon indicating that the cutout image area has been determined was selected. If it wasn't selected, the routine moves to step S34. In step S34, it is determined whether the icon indicating cancellation was selected. If it is determined that it wasn't selected, the routine moves to step S35. In step S35, it is determined whether any of the color control bars for brightness, contrast, and tone has been selected. If the color control bars have been selected, the color data of the color captured image stored in the storage region 153 is corrected or adjusted as selected by the user in the next step S36. Subsequently, the operation moves back to step S31.

If it is determined in step S35 that the color control bars have not been selected, then it is determined in step S37 whether the box for selecting a cutout area has been changed. If it has not been changed, the routine returns to the operation in step S31. If it has been selected, a process of changing the area selecting box is performed in step S38.

Subsequently, when the color control and the cutout area selecting box have been specified and the icon indicating the determination is selected, this selection is detected in step S32 and the routine moves to the next step S6. When it is determined in step S34 that the icon indicating cancellation is selected, the routine returns to the image selecting process in step S3.

Figure 9:
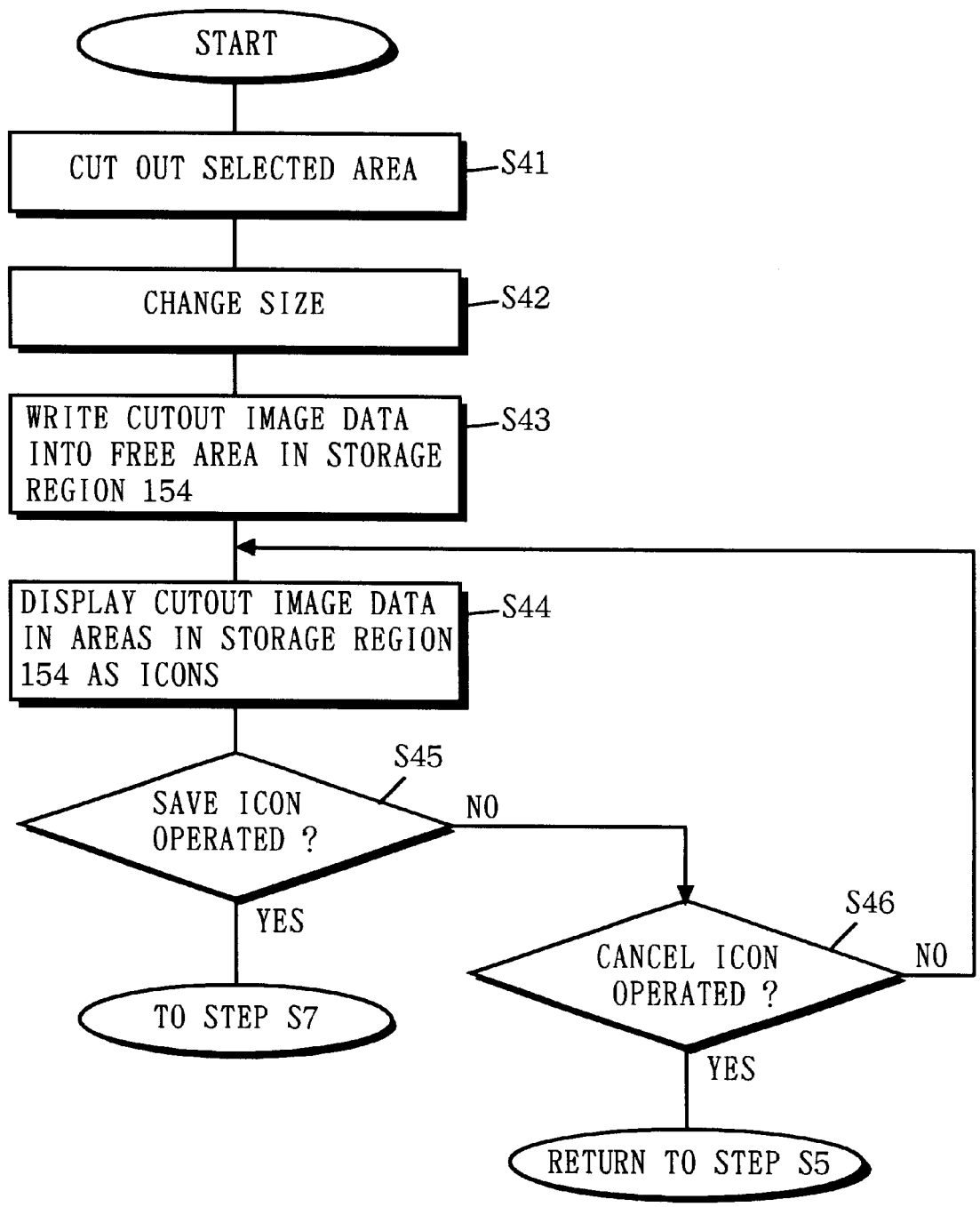
FIG. 9 is a subroutine flowchart showing an example cutout image confirming process.

Next, referring to FIG. 9, the process of confirming the cutout image (step S6) will be described in greater detail. When the cutout area has been selected in the above-described cutout area selecting process (step S5), the color image in the selected area is cut out in step S41. When it is required that the size of the cutout image be changed, a process of changing the size (a process of enlarging or contracting the section of the image to be cut out) is performed in step S42. Next, in step S43, the color data of the cutout image is written into a free area in the storage region 154. Next, in step S44, the cutout image data stored in the respective areas in the storage region 154 are displayed as icons on the right side of the screen as shown in FIG. 15, with the latest cutout image being displayed in the large area in the center of the screen. At the same time, icons for selecting saving or canceling of the latest cutout image are displayed on the left side of the screen. Next, in step S45, it is determined whether the icon for specifying "Save" is selected. When "Save" is not selected, it is determined in step S46 whether the icon indicating "Cancel" is selected. When neither of the icons is selected, the routine returns to the operation in step S44 and the operations in steps S44, S45 and S46 are repeated.

When the icon indicating "Save" is selected, it is decided in step S45 and the routine moves to the next step S7. When the icon indicating "Cancel" is selected, it is detected in step S46 and the routine returns to the cutout area selecting process in step S5.

Figure 10:
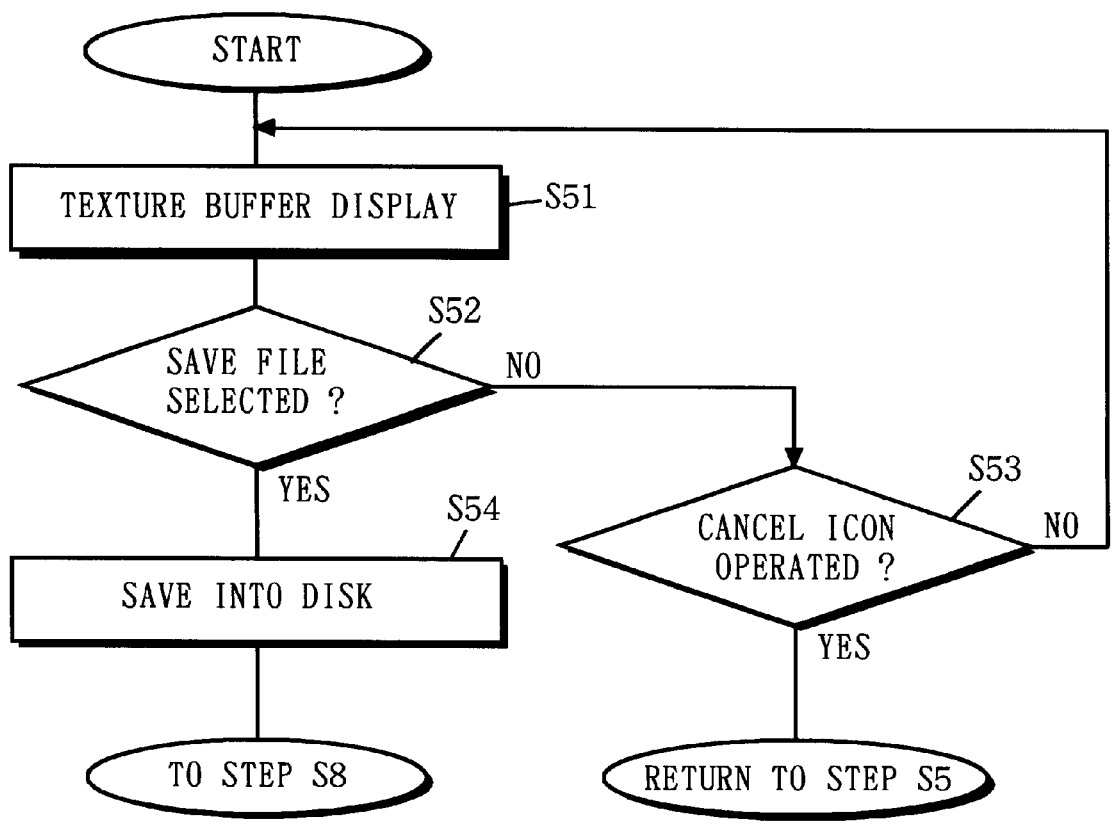
FIG. 10 is a subroutine flowchart showing a cutout image saving process.

Next, referring to FIG. 10, the process of saving the cutout image (step S7) will be described in detail. First, in step S51, the process of correcting the color captured image stored in the storage region 153 is performed, and then the color captured image data is transferred and stored into the storage region 155. In the process of correcting color captured image, when the captured image is a face of a person, the face is represented in an egg-shaped area inside the rectangular box (see FIG. 15). Accordingly, the captured image data in the four corners of the rectangular box is shaded or masked off. Or, alternatively, color data in two separate, distinct points in the face (e.g., forehead and chin) can be added and divided by two to obtain the average, and the average color data is written in the part of the captured image data outside the face outline. Another method of correcting the captured face image involves writing color data as if a filter or mask is superimposed on the cutout color captured image, wherein the filter or mask is transparent in the egg-shaped part surrounded by the rectangular box and the transparency decreases (i.e., the mask becomes more opaque) in areas outward from the periphery of the egg-shaped part. The color captured image thus corrected is enlarged and displayed in a large area in the center of the CRT display 52 (see FIG. 16) and is superimposed onto the shoulders of the character to receive the captured facial image.

At the same time, a plurality of icons of textures showing previously captured cutout images are displayed around the display frame, and various commands are also displayed. Next, in step S52, it is determined whether the cutout color captured image should be saved in the external storage medium, e.g., in the storage region in the RAM 32 (or in the writable region 45B in the magnetic disk 45). When the user does not select the icon indicating saving, this is detected in step S52 and the routine moves to step S53. The program detects in step S53 whether the icon indicating canceling is selected, and if it is determined that the icon is not selected, the routine moves to the operation in step S51. In this way, when none of the commands is selected, the operations in steps S51, S52 and S53 are repeated. At this time, if the user selects the command indicating saving (or backup storage), this is detected in step S52 and color data of the plurality of cutout images stored in the storage region 154 are written into the RAM 32 (or the writable region 45B in the magnetic disk 45) and the routine moves to the operation in step S8.

When the icon indicating canceling is selected, this is detected in step S53 and the routine returns to the cutout image area selecting process in step S5.

Next, with the character having the face cut out and pasted onto it as described above being displayed as shown in FIG. 18, the operation for causing the character to move (i.e., be animated) in a desired way will be described. In this case, as shown in FIG. 18, the face part of the character is changed to the cutout color captured image, and textures of clothes chosen by the user are pasted thereon.

Then, as shown in the left side of the display in FIG. 18, icons for selecting types of motion of the character are displayed. When one of the icons is selected, an animation display program (a program for realizing display of motion of the character) corresponding to the selected icon is read from the storage region 314 in the ROM 31 or from the storage region 454 in the magnetic disk 45, and written into the transfer and storage region in the RAM 15. Then the CPU 13 executes the transferred animation display program to calculate coordinate data of the polygons of the character, frame by frame, according to previously prepared movement patterns and animations. Further, textures (pattern tiles) of the hands, legs, body, clothes, etc. are pasted on the individual parts of the character on the basis of the calculation about a plurality of polygons, and they are written into the storage region 155. The texture data written in the storage region 155 is read and displayed, to give motion to the individual parts of the body of the character as a still object shown in FIG. 18.

The user can play games by using the image created in the above-described embodiment. In this case, the user operates the direction specifying switch 22 or the analog stick 23 to specify movement of the created character, and the background image is changed by program according to the movement of the character.

While the above-described embodiment provides an example in which image of a part of the body (e.g., the face) of an initial image, e.g., an image of a character, is changed to a separately captured color image, it is noted here that the present invention can be applied with a variety of modifications and changes. For example, the face part can be changed to a face of an animal, or an original picture of an animal can be used and the face of the original picture can be changed to a face of another animal.

While the present invention has been described in detail, the foregoing description is in all aspects illustrative and not restrictive. It is understood that numerous other modifications and variations can be devised without departing from the scope of the invention.

What is claimed is:

1. An image creating device for capturing image data supplied from a given video source and combining the image data with original image data to create a desired image, or an image obtained by processing the original image, and displaying the desired image on display means, said image creating device comprising:

operation input means for inputting instructions required for image creation according to operation by a user;

original image data storing means for temporarily storing the original image data;

first temporarily storing means for temporarily storing captured image data;

second temporarily storing means for temporarily storing at least one piece of cutout image data cut out from the captured image data;

third temporarily storing means for storing image data for said desired image to be displayed;

program storing means for storing program data for the image creation; and processing means for conducting processings for the image creation on the basis of the program data for the image creation stored in said program storing means;

wherein the program data stored in said program storing means includes, a first write program responsive to operation of said operation input means, for capturing the image data supplied from said given video source and writing the image data into said first temporarily storing means as said captured image data, a first read/display program for reading the captured image data stored in said first temporarily storing means and displaying the captured image in said display means, a cutout program for, when said operation input means is operated to specify an area of image to be cut out from the captured image displayed in said display means, temporarily storing the image data corresponding to the specified area into said second temporarily storing means as said cutout image data, a second read/display program for reading the cutout image data stored in said second temporarily storing means and displaying the cutout image data as an icon in part of screen of said display means, a second write program for reading the original image data stored in said original image data storing means and writing the original image data into said third temporarily storing means, a third write program for, when said operation input means is operated to select the icon of said cutout image in order to combine and display said cutout image in an image display position corresponding to a part of the original image displayed in said display means to be changed which was specified by operation of said operation input, writing the corresponding cutout image data stored in said second temporarily storing means upon the corresponding region in said third temporarily storing means, and a third read/display program for reading the combined image data stored in said third temporarily storing means in which said cutout image data is written and displaying the combined image data in said display means.

2. The image creating device according to claim 1, wherein said program storing means further contains a correcting program for applying correcting processing to the image data in a peripheral part in the cutout area specified by said operation input means before said cutout image data is written into said second temporarily storing means.

3. The image creating device according to claim 2, wherein said cutout program cuts out the image data in a rectangular area specified by said operation input means, and said correcting program corrects said cutout image data in the rectangular area by shading off a peripheral part around a shape defined by excluding the four corners of the specified rectangular area.

4. The image creating device according to claim 1, wherein said program storing means further contains a motion giving program for giving motion to individual parts of the original image, and when reading the combined image data stored in said third temporarily storing means on the basis of said third read/display program, said processing means applies given processing to the combined image data on the basis of said motion giving program to change motion of the individual parts of the combined image.

5. The image creating device according to claim 1, wherein said cutout program temporarily stores the cutout image data corresponding to the specified area into said second temporarily storing means each time said operation input means is operated to specify an area of image to be cut out, and said second read/display program reads the plurality of cutout image data stored in said second temporarily storing means and separately displays the plurality of cutout image data in part of the screen of said display means.

6. The image creating device according to claim 1, wherein said original image data storing means stores the original image data in the form of polygon data composed of a group of a plurality of polygons to display an image of a moving object as the original image, said program storing means further contains a motion giving program for giving motion to individual parts of said object, said second write program creates display image data on the basis of the plurality of polygon data stored in said original image data storing means and writes the display image data into said third temporarily storing means, said third write program writes the cutout image data stored in said second temporarily storing means into a storage region in said third temporarily storing means corresponding to a polygon position of the part to be changed which was specified by operation of said operation input means, and said processing means reads the combined image data stored in said third temporarily storing means to display an image obtained by combining the image based on the polygon data with the cutout image in said display means, and writes image data changed so that the individual parts based on the polygon data can be moved at predetermined cycle on the basis of said motion giving program, into said third temporarily storing means.

7. The image creating device according to claim 6, wherein said program storing means further contains a display control program for controlling display of said moving object, and said display control program includes a program for displaying a background image for said moving object, and a program responsive to operation of said operation input means, for giving change different from original motion to the motion of the moving object.

* * * * *